(12) United States Patent
Deiss et al.

(10) Patent No.: US 7,300,999 B2
(45) Date of Patent: Nov. 27, 2007

(54) METHOD OF MAKING POLYESTERS

(75) Inventors: Stefan Deiss, Harxheim (DE); Klaus Kirsten, Main (DE); Lutz Janko, Erzhausen (DE); Maik Rau, Hattersheim (DE)

(73) Assignee: Lurgi Zimmer GmbH, Frankfurt am Main (DE)

( * ) Notice: Subject to any disclaimer, the term of this patent is extended or adjusted under 35 U.S.C. 154(b) by 46 days.

(21) Appl. No.: 11/113,343

(22) Filed: Apr. 22, 2005

(65) Prior Publication Data

US 2005/0240005 A1 Oct. 27, 2005

(30) Foreign Application Priority Data

Apr. 23, 2004 (DE) .................. 10 2004 019 810

(51) Int. Cl.
*C08G 63/02* (2006.01)
(52) U.S. Cl. ................. 528/272; 210/198.2; 422/99; 422/100; 422/101; 528/271

(58) Field of Classification Search ............ 210/198.2; 422/99, 100, 101; 528/271, 272
See application file for complete search history.

(56) References Cited

U.S. PATENT DOCUMENTS

| 2,727,882 | A | | 12/1955 | Vodonik |
| 4,973,655 | A | | 11/1990 | Piper |
| 6,872,797 | B2 | * | 3/2005 | Ueno et al. ............... 528/85 |
| 2005/0027053 | A1 | * | 2/2005 | Uchiumi et al. ............ 524/404 |

FOREIGN PATENT DOCUMENTS

| EP | 0 000 918 | 3/1979 |
| EP | 0 346 735 | 12/1989 |

* cited by examiner

*Primary Examiner*—Terressa Boykin
(74) *Attorney, Agent, or Firm*—Jonathan Myers; Andrew Wilford

(57) ABSTRACT

Thermoplastic polyesters are made by a method in which precondensation is carried in a column whose sections are formed with structured packings and operated at subatmospheric, pressure.

10 Claims, 1 Drawing Sheet

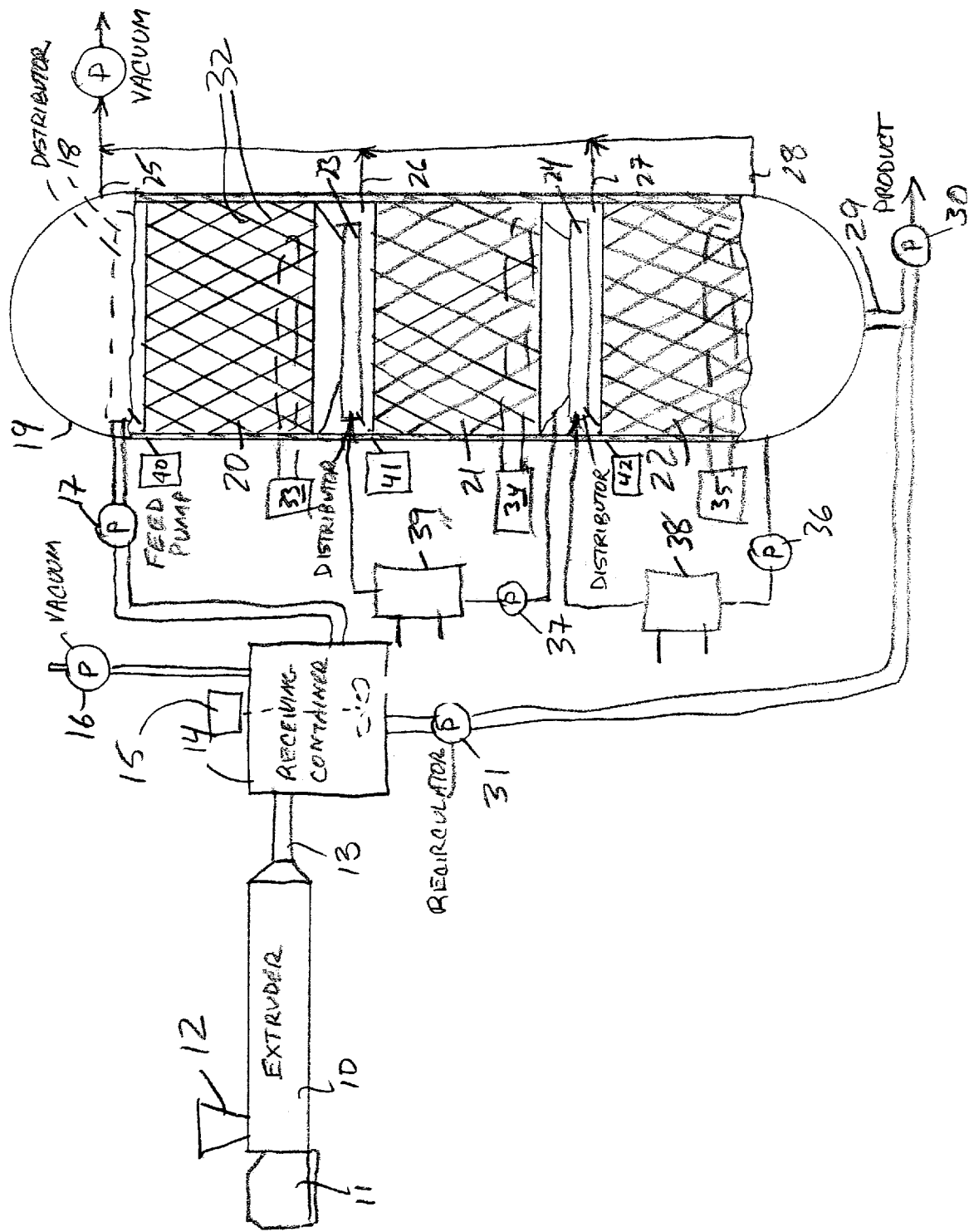

METHOD OF MAKING POLYESTERS

FIELD OF THE INVENTION

Our present invention relates to a method for the manufacturing of thermoplastic polyesters.

BACKGROUND OF THE INVENTION

Methods for manufacturing thermoplastic polyesters, in particular high-molecular-weight polyesters—for fibers, sheets, bottles and packaging material, are known.

The starting compounds, can be dicarboxylic acids or their esters and bifunctional alcohols that are converted in a melt. In a first reaction step, these are esterified or transesterified into monoesters, diesters, and oligoesters. The next process step is a prepolycondensation, in which under reduced pressure under elimination of condensation products such as water and alcohol, longer chains are built up. The viscosity of the melt gradually increases during this process step. This process step is followed by a polycondensation, in which a further chain build-up occurs with a distinct viscosity increase under greatly reduced pressure (vacuum).

In both the precondensation and the polycondensation it is important that the low-molecular-weight condensation products that are formed and the released monomers be removed as fast as possible from the reaction mixture, i.e. pass quickly from the liquid phase to the gas phase.

In principle, this can be achieved, depending upon the viscosity, by stirring and/or a selective increase in surface area with simultaneous reduction of the pressure up to vacuum. For the precondensation step, for example, in which considerable amounts of condensate still accumulate, agitated vessels are predominantly employed since the viscosity is still relatively low. An additional thorough mixing occurs through the outgassing of low-molecular-weight products, and agitated vessels are also among the standard equipment for vacuum processes.

Nevertheless, there has not been a lack of attempts to replace agitated vessels with other devices, in order to avoid their disadvantages such as longer diffusion paths due to an unfavorable surface/volume ratio, danger of dead-space formation and non-uniform residence times, i.e. a broad residence time spectrum, and in order to eliminate potential sources of failure such as e.g. agitator shaft seals.

EP 0,000,918 describes a method for the polycondensation of polyesters in a thin layer. There, a precondensation product is heated to 270°-340° C. in a heat exchanger in order to obtain a thin layer with a corresponding diffusion, and polycondensed in an adiabatic operation under vacuum (1.33 mbar), the temperature being continuously lowered by 30°-50° C.

For the realization of thin layers, pipes with internals such as heated inclined surface areas or heated pipes of different diameters are proposed. The high control complexity for the heating of the pipes in order to maintain the required temperature gradient, to ensure the intended film formation in all places, and the possibility of the formation of dead spaces are unfavorable. Additionally, nothing is said about how the conditions would be sustained under production conditions.

U.S. Pat. No. 4,973,655, a large surface is generated for the polycondensation by spraying a precondensate into an evaporation reactor. This leads to a polycondensation in solid phase, where the product thus formed is sprayed immediately into an extruder for further processing. This method, mainly intended for the manufacturing of polyamides, has also been proposed for polyester processes, without substantiating it by examples. There is nothing known about such an application.

U.S. Pat. No. 2,727,882 describes a tray column for the precondensation step of the polyethylene terephthalate process with specially shaped outlets, in which the product from the transesterification step is directed from the bottom up and the pressure is reduced from tray to tray with simultaneous increase of the temperature. The initial pressure is about 30-130 mbar, the final pressure at the head is 13 mbar, the temperature increase is between 5° C. and 25° C. It is explicitly required that the intrinsic viscosity (IV) not be greater than 0.3. That is, the melt has to be relatively low-viscosity in order to guarantee the functioning of this column. A somewhat higher viscosity will lead to less thorough mixing, to an inferior outgassing of mono- and oligomers, and to longer residence times that are undesired.

This limits the application possibilities for copolyesters and other polyesters. There is nothing said about the reprocessing of the vapors.

The column described in U.S. Pat. No. 2,727,882 is operated from the bottom up. Therefore it is very susceptible to failure, e.g. with throughput variations. In case of failure, the column empties very quickly and has to be restarted after remediation of the failure. Such failures have a large impact on the operation of the downstream end reactor and the product quality.

In EP 346,735, a column with internals for the precondensation is employed that is characterized by a large length/diameter ratio (133:1 to 80:1). The very small cross-section of 50 mm given leaves doubts about an implementation in large-scale installations. The flow through occurs top down, the residence times mentioned are extremely short (<10 min), the pressure is 500-800 mbar at the entrance, 13-0.7 mbar at the exit, temperatures of 260°-320° C. are mentioned. The internals mentioned in the document are tower packings such as Raschig or Pall rings that should have a free surface of 0.9-1.5 $m^2$/L in the first third and a surface of 0.3-0.5 $m^2$/L in the two other thirds. The vapors liberated in the separator are distilled and the diols returned to the process. The precondensate obtained that way is further condensed in the next step until a granulatable product is obtained, i.e. in principle a second precondensation, or a polycondensation to high molecular polyesters follows.

The equipment described in the documents U.S. Pat. No. 2,727,882 and EP 346,735 are tray or packed columns that have the advantages and disadvantages that are typical for their column type. As also especially emphasized in the patent, the tray column is characterized by good exchange on the individual trays, but both the longer residence time and the limiting viscosity are very unfavorable, especially when copolyesters or other polyesters such as e.g. PTT or PBT are to be manufactured. There is the danger that due to longer residence times, side reactions such as the formation of allyl alcohol and acrolein with PTT (polytrimethyleneterephthalate) or the formation of tetrahydrofuran with PBT are (polybutyleneterephthalate) facilitated. Additionally, a noticeably increased amount of diol is required for the operation of the tray column from the bottom up. This is very unfavorable energetically and increases the formation of side products. The packed column does have the advantages of a shorter residence time, but a transfer of the sizes given in the document to large-scale processes will be difficult.

In summary, it can be determined that the solutions proposed in the documents given above do not represent or represent only somewhat convincing alternatives to the conventional, versatilely applicable, and technically robust agitated vessel.

OBJECTS OF THE INVENTION

The principal object of the invention is to provide a method for the continuous and discontinuous manufacturing of linear thermoplastic polyesters, in which the precondensation is carried out in a column and the disadvantages of the known solutions are avoided.

Another object of the invention is to provide a method of producing polyesters in which drawbacks of systems using random packing and agitator-type mixing arrangements are avoided.

It is yet another object of the invention to provide a method for the purposes described that will obviate drawbacks of earlier systems as have been specifically mentioned above.

SUMMARY OF THE INVENTION

These objects are achieved by a method for the continuous and discontinuous manufacturing of linear thermoplastic polyesters, in which a transesterified or esterified product is directed top down through a column under reduced pressure. This column is comprised of several sections with structured packings and each section is equipped with a liquid distributor, a vapor outlet, and, at the bottom, a product outlet.

Columns with structured packings have been employed on a commercial scale since the seventies of the last century, i.e. they were also known to the inventors of EP 346,735. Surprisingly, there is nothing taught about an application of them in polyester processes, even though they offer significant technological advantages. Basically, they combine the advantages of tray and packed columns without their disadvantages. They provide large surfaces, small pressure losses, short residence times, less dead spaces, variable diameters, variable liquid load, a faster reaction due to short diffusion paths. Both efficiency and capacity are still considerably enhanced by a directed liquid and gas guidance and by a specific surface increase.

Particularly in two things, the columns with structured packings noticeably contrast with the columns with loose random packing (chaotic filling). The first concerns the uniformity of the wetting of the surfaces and the flow rates of the liquid phase on the internals.

Depending upon the shape and position of the tower packings (e.g. peripheral zones, flow profile), a loose random packing will lead to different flow rates and different layer thicknesses on the tower packings. With liquids with increased viscosity in particular, as is the case in the manufacturing of polyester, this problem will frequently arise due to the increased flow resistances. This leads to regions with considerably longer residence times, in which either longer chains which lead to a more non-uniform product build up, or to the formation of oligomers which are no longer dissolvable under column conditions, or to the deposition of unreacted monomers from the transesterification or esterification that increase in size through the attachment of other particles in such a way that it eventually leads to a clogging of the column. In columns with structured packings, the surfaces and the tilt angles of the packing elements are designed so that there are always uniform wetting and uniform flow rates. Clogging can thus be mostly avoided, the operational safety during start up and shut down and in case of failure is substantially higher.

The specific design of the surfaces of structured packings leads to the same effect that is achieved with larger surfaces in columns with loose packing having smaller surface areas per unit volume. In our tests, smaller surfaces than in EP 346 735 were sufficient. In order to achieve sustainably the advantages mentioned above, a good distribution of the liquid at the head of one of these columns or a section is required. Such liquid distributors are known, but without heating. Since column internals such as structured packings or tower packings are practically not heated and the solidification of the melt is a great danger with melt processes and the solidified product cannot, as e.g. with agitated vessels, be re-melted by means of an auxiliary heater, the liquid distributors are designed with a means of heating. This also provides greater safety in the case of failures and under start up and shut down conditions.

However, the above mentioned characteristics of a structured packing compared to a random packing or the different chaotic arrangement of internals affect the product quality and operating stability particularly favorably.

In a preferred embodiment, the column comprises 2 to 5 sections, each section being equipped with a product outlet at the bottom, having a vapor outlet, and being equippable with heat exchangers. The product feeding occurs from the top, the vapors are withdrawn at a position that is favorable for the particular section and the operating conditions and are returned to the overall process after separation of the low-boiling components. The withdrawal of the vapors may occur beneath the packing, e.g., in order to avoid the danger of an uncontrolled flooding of the column, or above the packing, e.g., in order to generate additional surface effects through gas-liquid-counterflow. Depending upon the process conditions, a suitable vapor withdrawal in the middle region of the column is also possible in order to combine the effects mentioned.

As starting material, a melt from the esterification or transesterification that is heated to or slightly above operating temperature by means of a heat exchanger and is fed into the first section by means of a liquid distributor, is used. At the lower end of the section, the melt is collected, a portion of the melt pumped again into the head of the section, where appropriate using a heat exchanger, and the other portion of the melt, in turn, is directed into the next section by means of a melt distributor, or is fed to the subsequent process step. The operating temperatures are between 180° and 350° C., preferably between 210° and 320° C.; the operating pressure is equal to or lower than the atmospheric pressure, preferably between 3 and 600 mbar. The structured packings have a surface of 50-290 $m^2/m^3$, preferably of 100-280 $m^2/m^3$, and most preferably of 150-251 $m^2/m^3$. The tilt angle to the vertical line is 15° to 65°, preferably 20° to 60°, and most preferably 30° to 45°. The design of the individual sections, in particular shape, size, and tilt angle of the structured surface may advantageously vary from section to section in order to adjust to the different polyesters and to the changing product properties, in particular to the increasing viscosity, and to the changing operating conditions, such as e.g. temperature, pressure, liquid load of the packing, vapor stream through the packing. With this approach, it is possible to adjust liquid load, pressure, and temperature, in short, the optimum operating point of the column, for each section.

Consequently, it is a particular advantage of the process according to the invention that the technical requirements for a process that is as fast as possible are implemented for different polyesters by means of equipment that is compact and relatively simple in set-up. During start up and shut down of the column and with failures, the method according to the invention also provides a noticeably higher operational safety and smaller amounts of waste.

The implementation of this concept allows for the expansion of the operating range of the column to at least 30-130% of the system throughput compared to the 50-110% of the state of the art. Likewise, the viscosity in the range of the intrinsic viscosity (IV) of IV=0.2-0.4 dL/g and the COOH end groups of 30-150 meq/kg may thereby be adjusted very precisely.

Thus, the specific return of a product portion stream in combination with the column with structured packings allows for a precondensation that is adapted to each polyester, and that, in addition, is particularly insusceptible to failures due to the easily changeable return and thereby also to the variations that occur in a system operation with increased throughput requirements. This represents a huge technical and economic advance compared to the previous solutions.

SPECIFIC EXAMPLES

The invention is now described in more detail by means of a few exemplary embodiments that are in no way limiting. The test results of the comparative examples and examples are summarized in Table 1.

The property values given were determined as follows:

The COOH end group concentration was determined using a photometric titration of a solution of an initial product of the polyester in a mixture of o-cresol and chloroform (70:30 parts by weight) with 0.05 n ethanolic potassium hydroxide solution against bromothymol blue.

The saponification number (VZ) was determined by saponification with potassium hydroxide in n-propanol and photometric titration in dimethyl formamide.

The intrinsic viscosity (IV) was measured at 25° C. in a solution of 500 mg polyester intermediate in 100 mL of a mixture of phenol and 1,2-dichlorobenzene (3:2 parts by weight).

The degree of polymerization was calculated from the IV.

Comparative Example 1

As starting material for the prepolycondensation, oligomer from the second esterification step of a continuous system for the manufacturing of polyethylene terephthalate, made on an industrial scale, was used. 6.5 kg of the oligomer was melted in an extruder and charged into a reaction vessel under normal pressure. For the specification of the initial state, a sample was drawn. Subsequently, it was prepolymerized with thorough mixing for 60 min at a pressure of 10 mbar and a temperature of 272° C. For comparison with conventional agitated prepoly reactors, the reactor content was circulated with 100 kg/h with a circulation pump. The reaction gases formed were continuously removed by adjusting the vacuum to 10 mbar. After the test had ended, a sample was drawn.

Example 1

With the same oligomer as in Comparative Example 1, a prepolycondensation was carried out in a test apparatus comprised of a receiving container, a circulation conduit with circulation pump, and a packing column. The packing column comprised structured packings with a specific surface of 200 m2/m3 and an angle of inclination to the vertical line of 30°. 6.5 kg of the oligomer were melted in an extruder and charged into the receiving container under normal pressure. For the specification of the initial state, a sample was drawn. Subsequently, it was prepolymerized with thorough mixing for 60 min at a pressure of 10 mbar and a temperature of 272° C. The oligomer was thereby continuously delivered from the receiving container with a circulation rate of 100 kg/h and charged from the top to the packing column, the drain of which was again connected to the receiving container. The reaction gases formed were continuously removed above the packing by adjusting the vacuum to 10 mbar. After the test had ended, a sample was drawn.

The prepolymerization using the packing column in Example 1 compared to Comparative Example 1 resulted in a rise of the increase in the degree of polymerization by about 48% under otherwise identical test conditions.

Comparative Example 2

The test was carried out as described in Comparative Example 1, but with a different oligomer as starting material.

Example 2

With the same oligomer as in Comparative Example 2, a prepolycondensation was carried out in an analogous manner to Example 1 in the test apparatus described in Example 1. Here, the packing column comprised structured packings with a specific surface of 250 $m^2/m^3$ and an angle of inclination to the vertical line of 30°.

The prepolymerization using the packing column in Example 2 compared to Comparative Example 2 resulted in a rise of the increase in the degree of polymerization by about 68% under otherwise identical test conditions.

Comparative Example 3

An oligomer was prepolymerized in a reaction vessel for 60 min at a pressure of 10 mbar and a temperature of 269° C. For comparison with conventional unagitated prepoly reactors, in which the product flows slowly in thin layers of about 200 to 500 mm, a static layer thickness of about 200 mm was set. For that purpose, 3.5 kg of the oligomer was used. The reaction gases formed were continuously removed by adjusting the vacuum to 10 mbar. For the specification of the initial state, a sample was drawn immediately prior to the start of the test. After the test had ended, an additional sample was drawn.

Example 3

With the same oligomer as in Comparative Example 3, a prepolycondensation was carried out in a test apparatus comprised of a receiving container, a circulation conduit with circulation pump, and a packing column. The packing column comprised structured packings with a specific surface of 250 $m^2/m^3$ and an angle of inclination to the vertical line of 45° 6.5 kg of the oligomer was melted in an extruder and charged into the receiving container under normal pressure. For the specification of the initial state, a sample was drawn immediately prior to the start of the test. Subsequently, it was prepolymerized with thorough mixing for 60 min at a pressure of 10 mbar and a temperature of 269° C. The oligomer was thereby continuously delivered from the receiving container with a circulation rate of 100 kg/h and charged from the top to the packing column, the drain of which was again connected to the receiving container. The reaction gases formed were continuously removed underneath the packing by adjusting the vacuum to 10 mbar. After the test had ended, a sample was drawn.

The prepolymerization using the packing column in Example 3 compared to Comparative Example 3 resulted in a rise of the increase in the chain length by about 117% under otherwise identical test conditions.

TABLE 1

TEST RESULTS

| | Reaction time min | COOH— end gr. meq/kg | Intr. viscosity dL/g | Saponification number KOH g/kg | Degree of polym. | Sb-content ppm |
|---|---|---|---|---|---|---|
| Comp. Ex. 1 | 0 | 279 | 0.135 | 570 | 8.7 | 205 |
| | 60 | 91 | 0.253 | 582 | 22.8 | 205 |
| Ex. 1 | 0 | 231 | 0.132 | 568 | 8.4 | 205 |
| | 60 | 67 | 0.297 | 579 | 29.2 | 205 |
| Comp. Ex. 2 | 0 | 163 | 0.125 | 572 | 7.6 | 212 |
| | 60 | 49 | 0.217 | 578 | 18.0 | 212 |
| Ex. 2 | 0 | 205 | 0.121 | 565 | 7.3 | 213 |
| | 60 | 52 | 0.267 | 575 | 24.8 | 213 |
| Comp. Ex. 3 | 0 | 110 | 0.118 | 560 | 7.0 | 185 |
| | 60 | 32 | 0.186 | 572 | 14.2 | 185 |
| Ex. 3 | 0 | 143 | 0.116 | 560 | 6.8 | 186 |
| | 60 | 36 | 0.250 | 578 | 22.4 | 186 |

BRIEF DESCRIPTION OF THE DRAWING

The above and other objects, features, and advantages will become more readily apparent from the following description, reference being made to the accompanying drawing in which:

An example of an apparatus which can be used, in accordance with the invention is shown in the sole FIGURE of the accompanying drawing which is a flow diagram illustrating the invention.

SPECIFIC DESCRIPTION

In the drawing we have shown an extruder 10 driven by a motor 11 and having an inlet hopper 12 for melting the oligomer and feeding the melt at 13 into a receiving container 14 under atmospheric pressure.

Within the receiving container 14, which can be provided with a mixer 15, the oligomer is prepolymerized with thorough mixing at a pressure below atmospheric pressure as has been noted as determined by a suction pump 16. The prepolymerized product is continuously delivered from the receiving chamber, e.g. by a feed pump 17, to a distributor 18 at the top of a packing column 19 which is provided with several sections 20, 21 and 22 of structured packing each section being equipped with a liquid distributor 18, 23, 24, a vapor outlet 25, 26, 27, 28 and provided at the bottom with a product outlet 29. The product can be discharged by the product pump 30 and a recirculation pump 31 is provided to recirculate the material below the last section, i.e. at the bottom of the column to the receiving container.

The structured packings 20, 21, 22 have specific surfaces of 50 to 290 $m^2/m^3$, preferably 100 to 280 $m^2/m^3$ and most preferably 150 to 251 $m^2/m^3$. The structured packing has its surfaces 32, represented only diagrammatically in the drawing, at a tilt angle to the vertical of 15 to 65°, preferably 20° to 60° and most preferably 30° to 45°.

Heaters can be provided at 33, 34, 35 for each of the sections. In addition, one or more of the sections can be provided with recycling pumps 36 and 37, for example, returning a portion of the product stream to the head of the respective section via a heat exchanger 38, 39.

In addition each of the liquid distributors 18, 23, 24 may be heated by heaters represented at 40, 41 and 42 respectively.

We claim:

1. A method of continuous or discontinuous production of a thermoplastic polyester, comprising the steps of:
   (a) providing a column having a plurality of sections with structured packings with a specific surface of 50 to 290 $m^2/m^3$;
   (b) passing a transesterification product downwardly through said column under reduced pressure and distributing the product over the sections with structured packings through respective liquid distributors heated to a temperature between 180 and 350° C.;
   (c) removing vapor from the sections with structured packings; and
   (d) recovering a thermoplastic polyester at a bottom of the column.

2. The method defined in claim 1 which comprises providing the structured packings with a specific surface of 100 to 280 $m^2/m^3$.

3. The method defined in claim 2 which comprises providing the structured packing with a specific surface of 150 to 251 $m^2/m^3$.

4. The method defined in claim 1 wherein according to step (b) at least one of said liquid distributors is heated to a temperature of 210 to 320° C.

5. A method of continuous or discontinuous production of a thermoplastic polyester, comprising the steps of:
   (a) providing a column having a plurality of sections with structured packings wherein the structured packings have surfaces with a tilt angle to the vertical of 15° to 65°;
   (b) passing a transesterification product downwardly through said column under reduced pressure and distributing the product over the sections with structured packings through respective liquid distributors heated to a temperature between 180 and 350° C.;
   (c) removing vapor from the sections with structured packings; and
   (d) recovering a thermoplastic polyester at a bottom of the column.

6. The method defined in claim 5 wherein the structured packings have surfaces with a tilt angle to the vertical of 20° to 60°.

7. The method defined in claim 6 wherein the structured packing have surfaces with a tilt angle to the vertical of 35° to 40°.

8. The method defined in claim 5 wherein according to step (b);
   at least one of said liquid distributors is heated to a temperature of 210 to 320° C.

9. A method of continuous or discontinuous production of a thermoplastic polyester, comprising the steps of:
   (a) providing a column having a plurality of sections with structured packings whit a specific surface of 50 to 290 $m^2/m^3$;
   (b) passing a transesterification product downwardly through said column under reduced pressure and distributing the product over the sections with structured packings through respective liquid distributors heated to a temperature between 180 and 350° C.;
   (c) removing vapor from the sections with structured packings;

(d) recovering a thermoplastic polyester at a bottom of the column; and (e) recycling a portion of a product stream from at least one of said sections to a head of that section through a heat exchanger.

10. The method defined in claim 9 wherein according to step (b) at least one of said liquid distributors is heated to a temperature of 210 to 320° C.

* * * * *